(12) United States Patent
Aihara

(10) Patent No.: US 11,178,299 B2
(45) Date of Patent: Nov. 16, 2021

(54) IMAGE READING APPARATUS

(71) Applicant: CANON KABUSHIKI KAISHA, Tokyo (JP)

(72) Inventor: Ryo Aihara, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/925,919

(22) Filed: Jul. 10, 2020

(65) Prior Publication Data

US 2021/0014373 A1 Jan. 14, 2021

(30) Foreign Application Priority Data

Jul. 11, 2019 (JP) .............................. JP2019-129306

(51) Int. Cl.
*H04N 1/04* (2006.01)
*H04N 1/00* (2006.01)

(52) U.S. Cl.
CPC ..... *H04N 1/00557* (2013.01); *H04N 1/00604* (2013.01)

(58) Field of Classification Search
CPC ........... H04N 1/00557; H04N 1/00604; H04N 1/00554; H04N 1/00551
See application file for complete search history.

(56) References Cited

U.S. PATENT DOCUMENTS

| 2002/0166208 A1* | 11/2002 | Kondo | E05F 1/1215 |
| | | | 16/289 |
| 2007/0251056 A1 | 11/2007 | Aoyagi | |
| 2017/0302814 A1* | 10/2017 | Yamamoto | G03G 15/602 |
| 2018/0278773 A1* | 9/2018 | Kii | H04N 1/00557 |

FOREIGN PATENT DOCUMENTS

| JP | 2007-300247 A | 11/2007 |
| JP | 2013-098695 A | 5/2013 |

* cited by examiner

*Primary Examiner* — Moustapha Diaby
(74) *Attorney, Agent, or Firm* — Venable LLP

(57) ABSTRACT

An image reading apparatus, including: a hinge configured to support an original conveying unit pivotably relative to an image reading unit; a swing pedestal configured to support the hinge; a swing axis configured to support the swing pedestal swingably relative to the image reading unit; and a first abutment portion and a second abutment portion configured to abut the image reading unit so as to form a space between the image reading unit and the original conveying unit, wherein the first abutment portion that is in a state not in contact with the image reading unit can be brought into contact with the image reading unit by the swing pedestal swinging about a swing axis in a state in which the second abutment portion is in contact with the image reading unit.

6 Claims, 5 Drawing Sheets

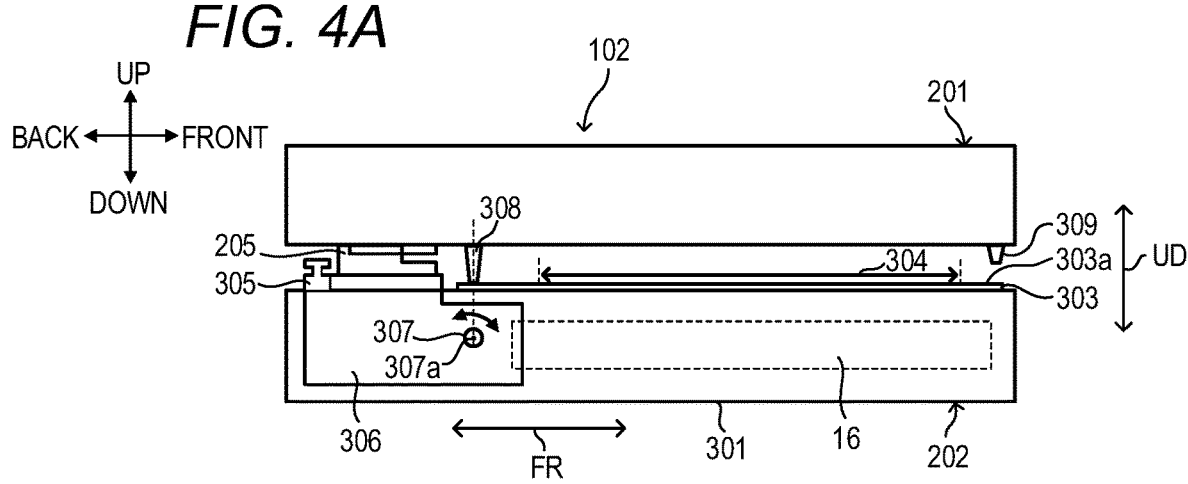
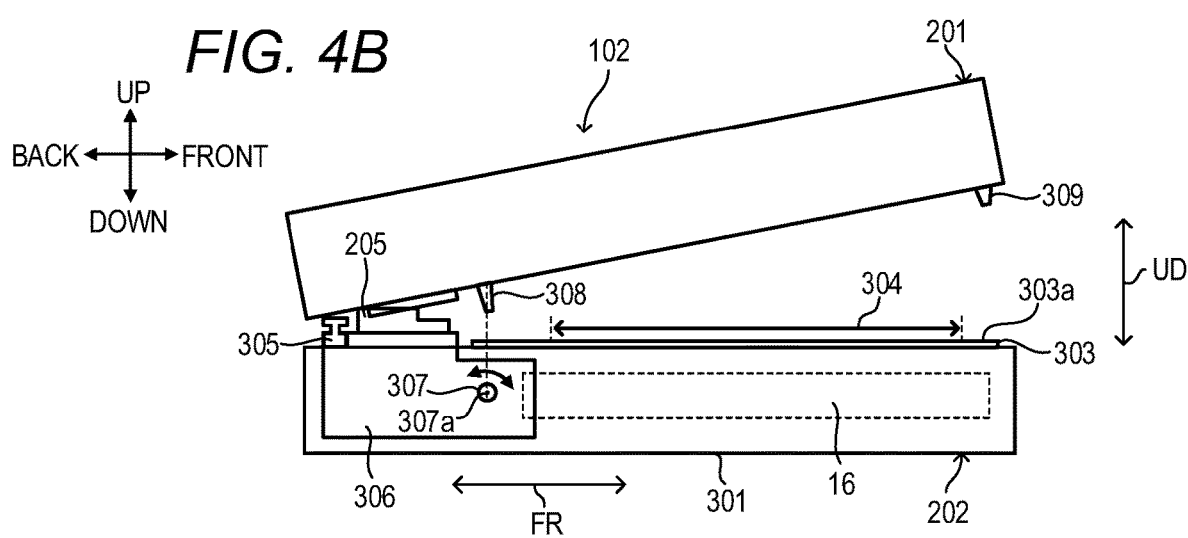
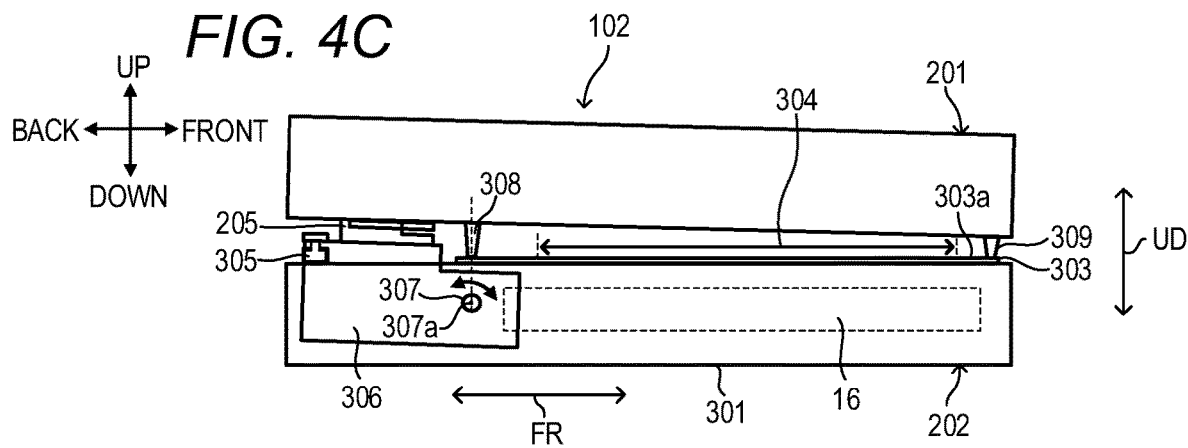

IMAGE READING APPARATUS

BACKGROUND OF THE INVENTION

Field of the Invention

The present invention relates to an image reading apparatus, which includes an original conveying device configured to convey an original, and is configured to read an image of the original conveyed by the original conveying device.

Description of the Related Art

Hitherto, as an image reading apparatus provided to an image forming apparatus such as a copying machine and a multifunction peripheral, there has been known an image reading apparatus including an original conveying device (hereinafter referred to as "ADF"). The ADF is mounted to the image reading apparatus with a hinge device, and is pivotable relative to the image reading apparatus by the hinge device. The ADF includes an original tray on which an original bundle is stacked, an original conveying portion configured to convey an original, and an original delivery tray provided below the original tray. The image reading apparatus includes a flow reading glass plate. The ADF is configured to automatically separate originals one by one from the original bundle placed on the original tray, and to convey the original to the flow reading glass plate by the original conveying portion. The image reading portion provided to the image reading apparatus is configured to read an image of the original conveyed above the flow reading glass plate by the ADF. After the image of the original is read by the image reading apparatus, the original is delivered onto the original delivery tray. An image reading mode of reading the image of the original conveyed by the ADF by the image reading apparatus as described above is generally called a flow reading mode.

The image reading apparatus includes an original glass plate on which the original is placed. The ADF includes an original pressing plate (hereinafter referred to as "original cover") configured to press the original placed on the original glass plate against the original glass plate. The ADF is pivotable between an open position and a closed position by the hinge device. In order that a user can place the original on the original glass plate, the ADF is pivoted to the open position to open the original glass plate. The ADF is pivoted to the closed position so that the original placed on the original glass plate is pressed against the original glass plate by the original cover. The image reading portion reads the image of the original while moving below the original placed on the original glass plate. An image reading mode for reading the image of the original placed on the original glass plate by the image reading apparatus without use of the original conveying function of the ADF as described above is generally called a fixed reading mode.

Incidentally, when the ADF is to be mounted to the image reading apparatus with the related-art hinge device, it is required to adjust a position of the ADF with respect to the image reading apparatus such that the ADF is located at a suitable position (mounting height) with respect to the image reading apparatus. In the related-art technology, the mounting height of the ADF with respect to the image reading apparatus is not automatically adjusted, and hence is adjusted by a manual operation. The adjusting operation of the mounting height of the ADF with respect to the image reading apparatus is required to be performed at the time of shipment of the image forming apparatus or replacement of the ADF. The adjusting operation of the mounting height of the ADF with respect to the image reading apparatus (distance between the image reading apparatus and the ADF) is performed with use of an adjusting mechanism provided to the hinge device such that abutment portions provided to the ADF are brought into abutment against the flow reading glass plate (Japanese Patent Application Laid-Open No. 2007-300247). The adjusting operation differs in operation time depending on experience of an operator, and in a case of a less-experienced operator, a long period of time is required, with the result that manufacturing cost is increased.

In view of this, in Japanese Patent Application Laid-Open No. 2013-98695, marks having luminance different from luminance of a surface of a platen roller provided to the ADF are provided on the surface of the platen roller. The mounting height is calculated based on luminance distribution information in a scanning line direction, which is acquired based on the reading result of the platen roller and the reading result of the marks, and then the mounting height is displayed on a display portion. An operator adjusts the mounting height of the ADF with respect to the image reading apparatus based on the adjusting height displayed on the display portion. With this, the operation time for the operator can be shortened.

However, in the related-art technology described in Japanese Patent Application Laid-Open No. 2013-98695, it is required that an operator repeatedly adjust the mounting height of the ADF in accordance with the calculated mounting height. Therefore, in the related-art technology, an operation time for carrying out a step of adjusting the mounting height of the ADF is required. Thus, there is a problem in that the manufacturing cost is increased by the amount corresponding to the operation time.

SUMMARY OF THE INVENTION

According to an embodiment of the present invention which has been made to solve the above-mentioned problem, there is provided an image reading apparatus, comprising:

an original conveying unit including a stacking tray on which an original is to be stacked, a conveying unit configured to convey the original stacked on the stacking tray, a discharging unit configured to discharge the original conveyed by the conveying unit, and a discharging tray on which the original discharged by the discharging unit is to be stacked;

an image reading unit including a transparent member and a reading element configured to read an image of the original conveyed by the conveying unit through the transparent member;

a hinge configured to support the original conveying unit so that the original conveying unit turns with respect to the image reading unit, wherein the original conveying unit is rotatable with respect to the image reading unit by the hinge between a first position in which the original conveying unit covers the transparent member and a second position in which the original conveying unit exposes the transparent member;

a swing pedestal configured to support the hinge and provided on the image reading unit swingably with respect to the image reading unit;

a first abutment portion provided on the original conveying unit and configured to abut the image reading unit so as to form a space between the image reading unit and the original conveying unit when the original conveying unit is located in the first position; and a second abutment portion provided on the original conveying unit and configured to abut the image reading unit so as to form a space between the image reading unit and the original conveying unit when the original conveying unit is located in the first position, wherein the second abutment portion is provided opposite to the first abutment portion with respect to a position of a center of the original conveying unit in a width direction orthogonal to a rotation axis of the original conveying unit and parallel to the transparent member, wherein the first abutment portion that is in a state not in contact with the image reading unit can be brought into contact with the image reading unit by the swing pedestal swinging about a swing axis in a state in which the second abutment portion is in contact with the image reading unit.

Further features of the present invention will become apparent from the following description of exemplary embodiments with reference to the attached drawings.

BRIEF DESCRIPTION OF THE DRAWINGS

FIG. 4A, FIG. 4B, and FIG. 4C are side views of the image reading apparatus.

DESCRIPTION OF THE EMBODIMENTS

Now, embodiments of the present invention are described with reference to the attached drawings.

First Embodiment (Image Forming Apparatus)

Figure 1:
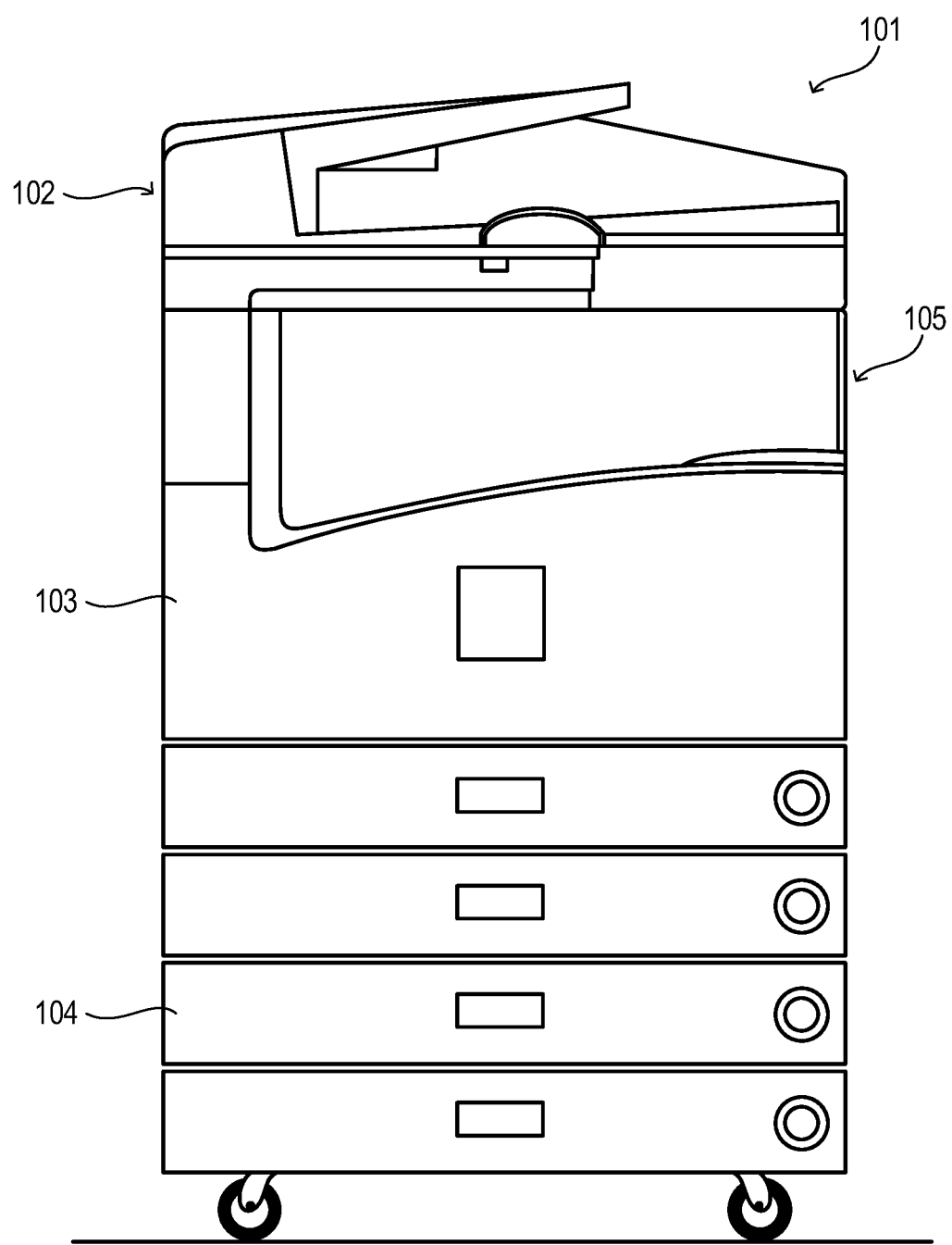
FIG. 1 is a view for illustrating an image forming apparatus including an image reading apparatus.

Now, a first embodiment of the present invention is described with reference to FIG. 1, FIG. 2, FIG. 3A, FIG. 3B, FIG. 4A, FIG. 4B, and FIG. 4C. First, an image forming apparatus 101 is described with reference to FIG. 1. FIG. 1 is a view for illustrating the image forming apparatus 101 including an image reading apparatus 102. The image forming apparatus 101 includes the image reading apparatus 102, an image forming portion main body 103, and a feeding cassette 104. The image reading apparatus 102 is provided above the image forming portion main body 103. The image reading apparatus 102 includes an original reading portion 16 (FIG. 4A) configured to read an image of an original. The image reading apparatus 102 is configured to read an image of an original and generate image data.

The feeding cassette 104 is provided below the image forming portion main body 103. On the feeding cassette 104, a recording medium (hereinafter referred to as "sheet") is stacked. The image forming apparatus 101 includes a sheet conveying portion (not shown) configured to convey sheets one by one from a sheet bundle stacked on the feeding cassette 104 to the image forming portion main body 103. The image forming portion main body 103 includes an image forming portion (not shown) configured to form an image on a sheet in accordance with image data generated by the image reading apparatus 102. The image forming portion (not shown) includes a laser writing portion (not shown), an electrophotographic processing portion (not shown), and a fixing portion (not shown). The image forming portion (not shown) is configured to form an image on a sheet by an electrophotographic method. A delivery portion 105 is provided in a space between the image reading apparatus 102 and the image forming portion main body 103. The sheet having the image formed thereon by the image forming portion main body 103 is delivered onto the delivery portion 105.

(Image Reading Apparatus)

Next, the image reading apparatus 102 is described with reference to FIG. 2, FIG. 3A, and FIG. 3B.

Figure 2:
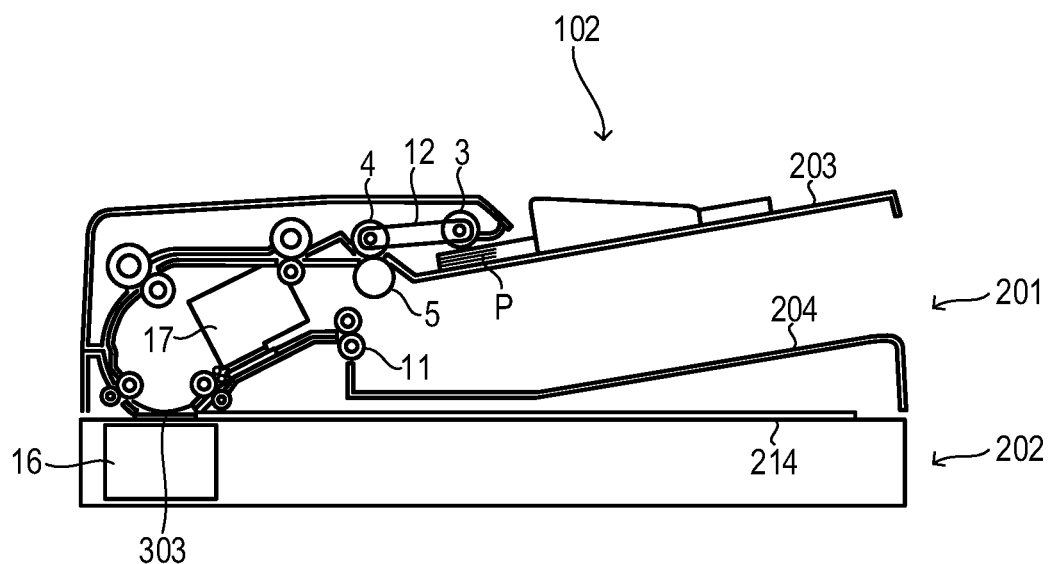
FIG. 2 is a sectional view for illustrating a configuration of the image reading apparatus.

FIG. 2 is a sectional view for illustrating a configuration of the image reading apparatus 102. The image reading apparatus 102 includes an ADF 201, which serves as an original conveying device configured to convey an original, and an image reading portion main body 202. The image reading portion main body 202 is provided below the ADF 201. The ADF 201 is openable and closable with respect to the image reading portion main body 202.

Originals P stacked on an original tray 203 of the ADF 201 are fed one by one by a pickup roller 3, and are then conveyed by a feed roller 4. A separation roller 5 in pressure contact with the feed roller 4 is provided at a position opposed to the feed roller 4. The separation roller 5 is configured to rotate when a load torque equal to or larger than a predetermined torque is applied to the separation roller 5. The separation roller 5 has a function of separating two originals fed in a stacked state.

The pickup roller 3 and the feed roller 4 are coupled to each other through intermediation of a swing arm 12. The swing arm 12 is supported by a rotation shaft of the feed roller 4 so as to be pivotable about the rotation shaft of the feed roller 4.

The original P is conveyed by, for example, the feed roller 4, and is delivered onto an original delivery tray 204 by a delivery roller 11.

The image reading portion main body 202 includes the original reading portion 16 configured to read an image on a first surface of the original P to be conveyed. Further, the ADF 201 includes an original reading portion 17 configured to read an image on a second surface of the original P to be conveyed.

Further, as a reading mode for reading the original, there are given a first reading mode and a second reading mode. The first reading mode is a mode of reading the image of the original conveyed above the flow reading glass plate 303 by the above-mentioned method. The second reading mode is a mode of reading an image of an original placed on an original glass plate 214 of the image reading portion main body 202 by the original reading portion 16 moving at a constant speed. In general, an image of a sheet-like original is read in the first reading mode, and an image of a bound original such as a book or a booklet is read in the second reading mode.

Figure 3A:
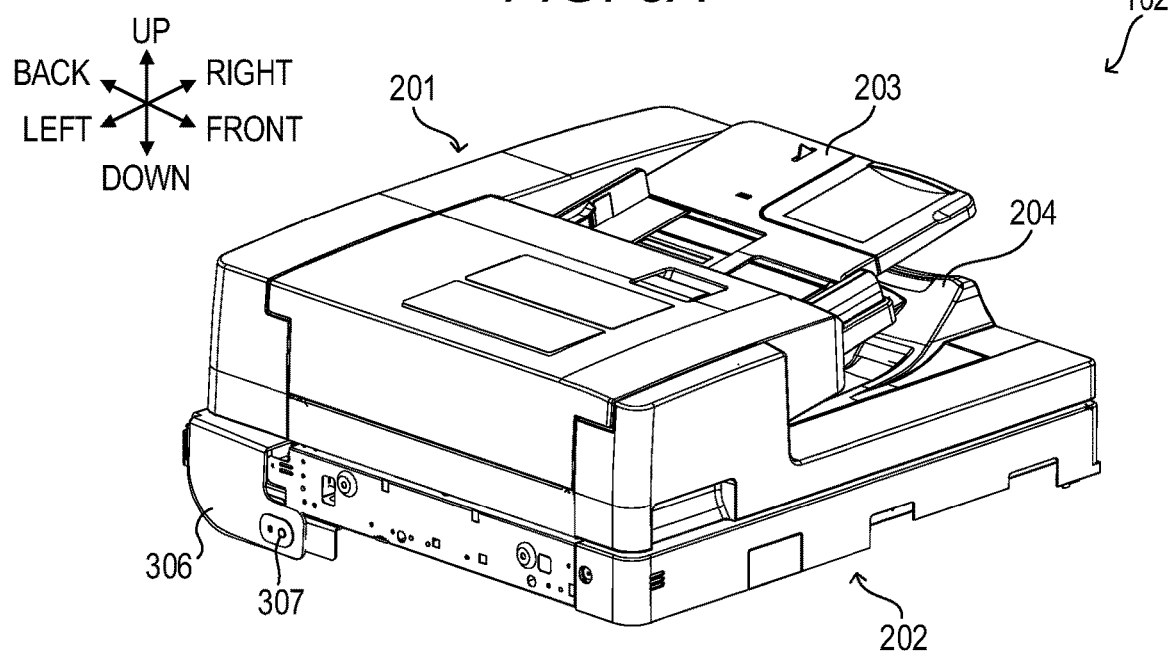
FIG. 3A and FIG. 3B are perspective views of the image reading apparatus.
Figure 3B:
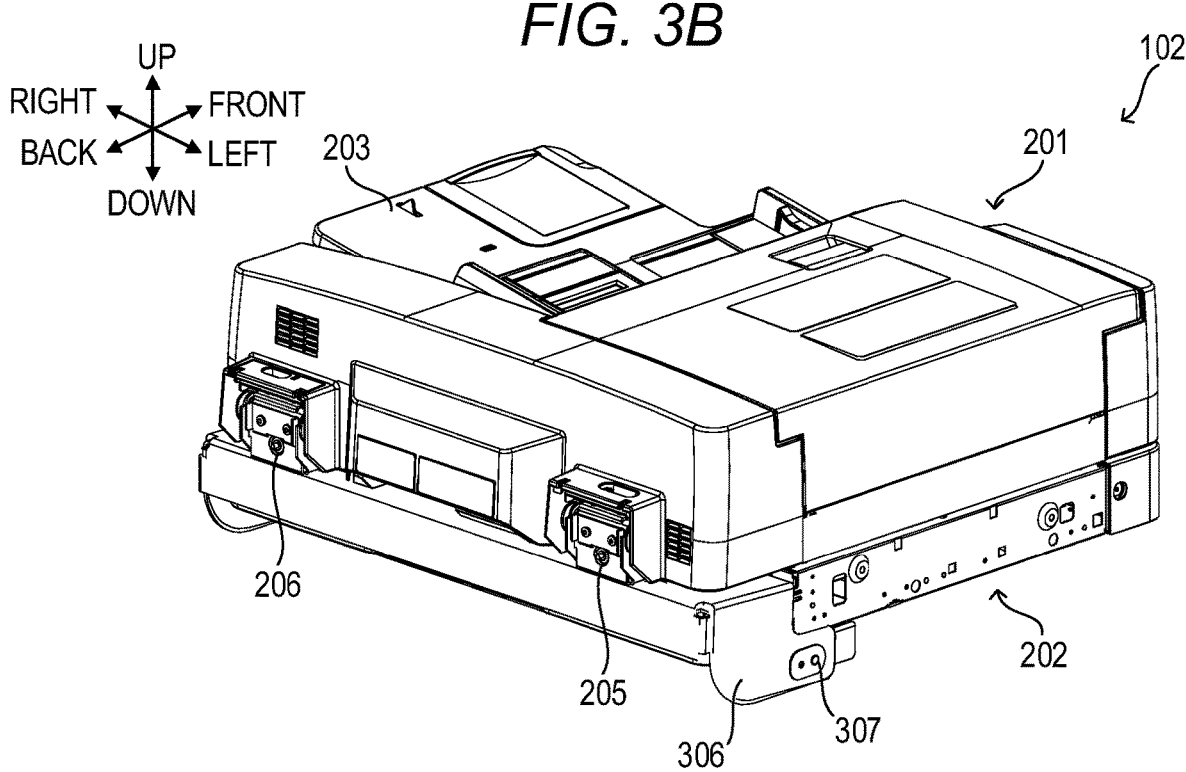

FIG. 3A and FIG. 3B are perspective views of the image reading apparatus 102. FIG. 3A is a perspective view of the image reading apparatus 102 as viewed from a left front side. FIG. 3B is a perspective view of the image reading apparatus 102 as viewed from a left back side. The image reading portion main body 202 includes the flow reading glass plate 303.

As illustrated in FIG. 3B, the ADF 201 is supported by at least one hinge so as to be pivotable relative to the image reading portion main body 202. The ADF 201 is pivotable between a first position (closed position) at which the ADF 201 presses the original placed on the original glass plate 214 against the original glass plate 214 and a second position at which an angle of the ADF 201 with respect to the image reading portion main body 202 is larger than an angle thereof at the first position. The image reading portion main body 202 includes at least one swing pedestal 306 configured to support at least one hinge. In the first embodiment, the ADF 201 is supported by a left hinge 205 and a right hinge 206 so as to be pivotable relative to the image reading portion main body 202. The left hinge 205 and the right hinge 206 are mounted to the ADF 201 and the swing pedestal 306 supported on the image reading portion main body 202 so as to be swingable about a swing axis 307.

Next, the principle that eliminates the need for height adjustment of the ADF 201 with respect to the image reading portion main body 202 is described with reference to FIG. 4A, FIG. 4B, and FIG. 4C. FIG. 4A, FIG. 4B, and FIG. 4C are side views of the image reading apparatus 102. FIG. 4A is a side view of the image reading apparatus 102 when the ADF 201 is in a designed position. As illustrated in FIG. 4A, the image reading portion main body 202 includes a main body frame 301. The original reading portion 16 configured to read an image of an original is provided inside the main body frame 301. The original reading portion 16 is located below the flow reading glass plate 303. The original reading portion 16 is configured to read an image of an original conveyed above the flow reading glass plate 303 by the ADF 201. The original reading portion 16 has a shape elongated in a front-back direction FR of the image reading apparatus 102. The flow reading glass plate 303 has a length including an image reading area 304, which allows the original reading portion 16 to read an image of an original in the front-back direction FR.

A back abutment portion 308 and a front abutment portion 309 are provided to the ADF 201 at positions opposed to the flow reading glass plate 303 and outside the image reading area 304. The back abutment portion 308 is provided on the back side of the ADF 201. The back abutment portion 308 is provided on the back side with respect to the image reading area 304 in the front-back direction FR, and is brought into contact with the flow reading glass plate 303 when the ADF 201 is in the closed position. The front abutment portion 309 is provided on the front side of the ADF 201, which is opposite to the back side. The front abutment portion 309 is provided on the front side with respect to the image reading area 304 in the front-back direction FR. The front abutment portion 309 can be brought into contact with the flow reading glass plate 303 when the ADF 201 is fully closed to be in the closed position.

The back abutment portion 308 has a dimension and a shape determined such that, even in consideration of a variation in tolerance or assembly, the back abutment portion 308 is reliably brought into abutment against the flow reading glass plate 303 when the ADF 201 is in the designed position illustrated in FIG. 4A. Meanwhile, the front abutment portion 309 has a dimension and a shape determined such that, even in consideration of a variation in tolerance or assembly, the front abutment portion 309 is not brought into contact with the flow reading glass plate 303 when the ADF 201 is in the designed position illustrated in FIG. 4A. When the ADF 201 is in the designed position illustrated in FIG. 4A, a lower end portion of the front abutment portion 309 is located on the upper side with respect to a lower end portion of the back abutment portion 308 in a vertical direction UD.

The swing axis 307 is held on the main body frame 301 of the image reading portion main body 202. The swing pedestal 306 is held by the swing axis 307 so as to be pivotable. The swing pedestal 306 is swingable about the swing axis 307 relative to the main body frame 301 of the image reading portion main body 202. The swing axis 307 is arranged at a position lower in the vertical direction UD than a contact surface 303a of the flow reading glass plate 303, with which the front abutment portion 309 is to come into contact. When the ADF 201 is in the designed position illustrated in FIG. 4A, the swing axis 307 is arranged below the back abutment portion 308 in the vertical direction UD.

FIG. 4B is a side view of the image reading apparatus 102 when a back end portion of the ADF 201 is brought into abutment against a swing pedestal regulation member 305. When the ADF 201 is opened toward an open position, the back end portion of the ADF 201 is brought into abutment against the swing pedestal regulation member 305. The swing pedestal regulation member 305 is fixed to an upper portion of the main body frame 301 on the back side of the image reading apparatus 102 in the front-back direction FR. In order to prevent the swing pedestal 306 from pivoting counterclockwise about the swing axis 307 more than necessary when the ADF 201 is opened, the ADF 201 is brought into abutment against the swing pedestal regulation member 305 to regulate a swing range of the swing pedestal 306. The ADF 201 is further pivoted counterclockwise relative to the image reading portion main body 202 by the left hinge 205 and the right hinge 206 to reach the open position. When the ADF 201 is in the open position, the ADF 201 opens the original glass plate 214 so that a user can place an original on the original glass plate 214.

FIG. 4C is a side view of the image reading apparatus 102 when the ADF 201 is in the closed position. The ADF 201 is pivoted clockwise relative to the image reading portion main body 202 by the left hinge 205 and the right hinge 206 to be in the closed position. When the ADF 201 is pivoted clockwise from the open position by the left hinge 205 and the right hinge 206, and the ADF 201 is further pivoted via the position illustrated in FIG. 4B, as illustrated in FIG. 4A, the back abutment portion 308 is brought into abutment against the flow reading glass plate 303. After that, the swing pedestal 306 swings about the swing axis 307 in the clockwise direction integrally with the ADF 201 by the own weight of the ADF 201, and the front abutment portion 309 is automatically brought into abutment against the flow reading glass plate 303.

In side view of the image reading apparatus 102, a straight line extending in the vertical direction UD and passing through a swing center 307a of the swing axis 307 aligns with a longitudinal axial line of the back abutment portion 308 when the ADF 201 is in the designed position illustrated in FIG. 4A. That is, in the front-back direction FR, the position of the back abutment portion 308 matches with the swing center 307a of the swing axis 307. The movement of the back abutment portion 308 in accordance with the swing of the swing pedestal 306 forms an arc-shaped path about the swing axis 307. The movement amount in the vertical direction UD at the highest point of the arc is negligible. Therefore, the movement amount of the back abutment portion 308 in the vertical direction UD when the swing pedestal 306 swings about the swing axis 307 in the clockwise direction together with the ADF 201 by the own weight of the ADF 201 is negligible. Accordingly, both the back abutment portion 308 and the front abutment portion 309 are brought into abutment against the flow reading glass plate 303, and then the height adjustment of the ADF 201 with respect to the image reading portion main body 202 is automatically completed.

The swing pedestal regulation member 305 is brought into abutment against the swing pedestal 306 so as to regulate the pivoting of the swing pedestal regulation member 305 in the clockwise direction beyond a predetermined swing range when the ADF 201 is swung in the closing direction. As an ideal position of the swing axis 307 when the ADF 201 is in the designed position, the case in which the swing axis 307 is located below the back abutment portion 308 in the vertical direction UD as illustrated in FIG. 4A is illustrated. However, the first embodiment is not limited thereto.

Figure 5:
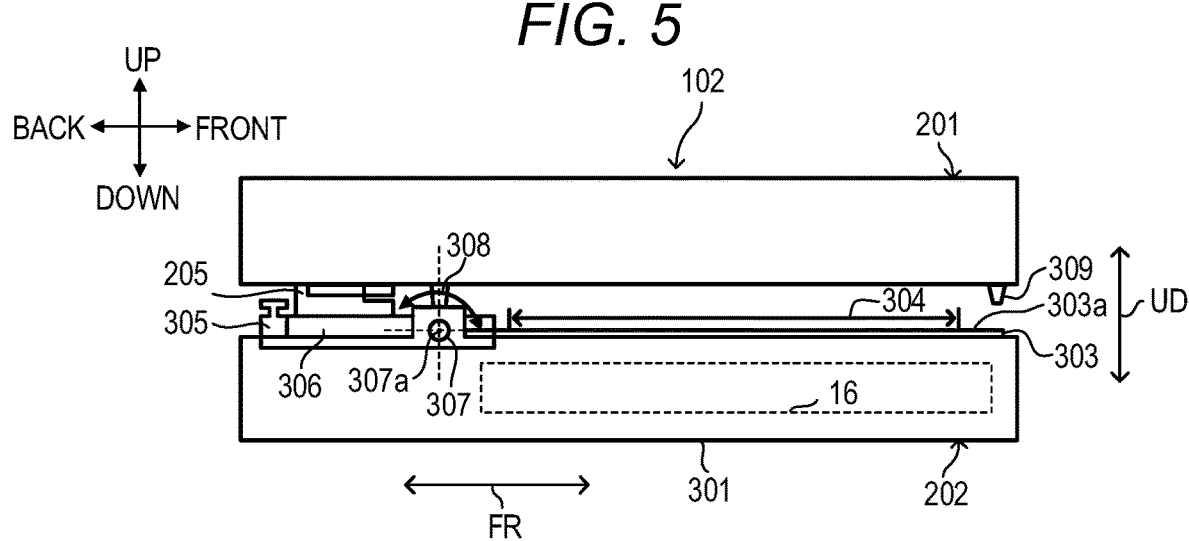
FIG. 5 is a side view of an image reading apparatus according to another embodiment of the present invention.

FIG. 5 is a side view of the image reading apparatus according to another embodiment of the present invention. For example, as illustrated in FIG. 5, the swing center 307a of the swing axis 307 may be located at the same height as the contact surface 303a of the flow reading glass plate 303, with which the back abutment portion 308 is to be brought into contact. Also in this case, in side view of the image reading apparatus 102, the straight line extending in the vertical direction UD and passing through the swing center 307a of the swing axis 307 aligns with the longitudinal axial line of the back abutment portion 308 when the ADF 201 is in the designed position illustrated in FIG. 5. In the front-back direction FR, the position of the back abutment portion 308 matches with the swing center 307a of the swing axis 307. The swing axis 307 may be provided outside the main body frame 301 of the image reading portion main body 202, or may be provided so as to bite into a part of the image reading portion main body 202.

As further another embodiment, the swing center 307a of the swing axis 307 may be displaced from the position immediately below the back abutment portion 308 in the vertical direction to any side in the front-back direction FR below the contact surface 303a of the flow reading glass plate 303, with which the back abutment portion 308 is to be brought into contact. When the swing center 307a is arranged so as to be displaced toward the back side in the front-back direction FR, through the swing of the swing pedestal 306 in the clockwise direction, the front abutment portion 309 is moved toward the lower side in the vertical direction UD, and at the same time, the back abutment portion 308 is moved toward the lower side in the vertical direction UD. In this case, the movement amount of the back abutment portion 308 toward the lower side is large. Thus, it is preferred that the back abutment portion 308 be formed so as to be elastically deformable and/or that the ADF 201 be formed so as to be deformable by its own weight. With this, both the back abutment portion 308 and the front abutment portion 309 are brought into abutment against the flow reading glass plate 303, and the height adjustment of the ADF with respect to the image reading portion main body 202 is automatically completed.

Conversely, when the swing center 307a is arranged so as to be displaced toward the front side in the front-back direction FR, through the swing of the swing pedestal 306 in the clockwise direction, the front abutment portion 309 is moved toward the lower side in the vertical direction UD, and at the same time, the back abutment portion 308 is moved toward the upper side in the vertical direction UD. In this case, the back abutment portion 308 is moved in a direction of separating away from the flow reading glass plate 303. In view of this, the back abutment portion 308 has a dimension and a shape determined such that the back abutment portion 308 is elastically deformed and is compressed in advance by the own weight of the ADF 201 when the ADF 201 is in the designed position illustrated in FIG. 4A. Even when the back abutment portion 308 is moved toward the upper side in the vertical direction UD through the swing of the swing pedestal 306 in the clockwise direction, the back abutment portion 308 is elastically restored. Thus, the back abutment portion 308 is prevented from separating away from the contact surface 303a of the flow reading glass plate 303.

Further, when the swing center 307a of the swing axis 307 is arranged on the further lower side, the displacement amount of the front abutment portion 309 toward the lower side becomes smaller when the swing pedestal 306 is pivoted by a certain angle. As a result of an experiment conducted based on the above-mentioned facts, it was found that an effect of a second embodiment can be obtained when the swing center 307a of the swing axis 307 is located, in side view of the ADF 201, within a predetermined range described below with respect to the back abutment portion 308 as a reference.

Within a range of 250 mm from the contact surface 303a to the lower side in the vertical direction UD Within a range of 20 mm from the back abutment portion 308 to the front side in the front-back direction FR Within a range of 40 mm from the back abutment portion 308 to the back side in the front-back direction FR According to the first embodiment, the distance between the ADF 201 and the image reading portion main body 202 is automatically adjusted. Therefore, when the image reading apparatus 102 is to be assembled, an operator is not required to adjust the distance between the ADF 201 and the image reading portion main body 202. Thus, operation time is shortened, and manufacturing cost is reduced. According to the first embodiment, the manufacturing cost is reduced.

Second Embodiment

Figure 6:
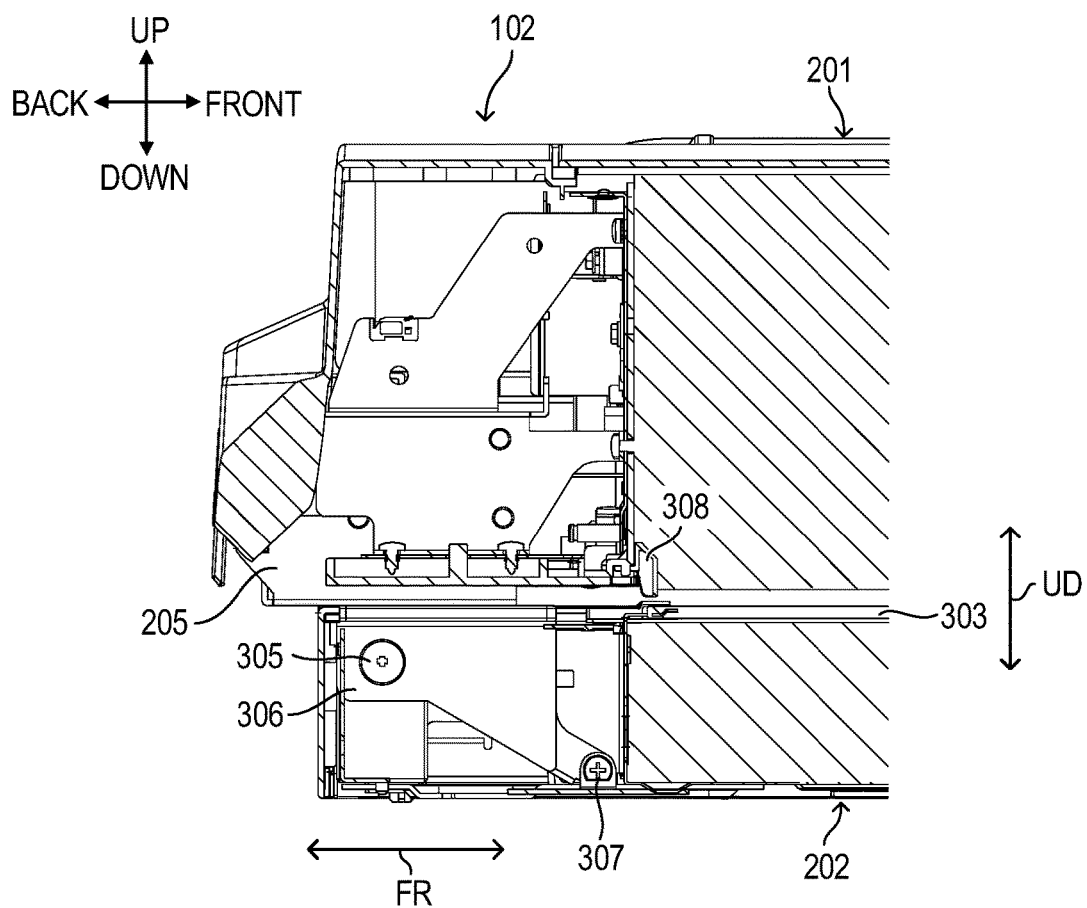
FIG. 6 is a partial sectional side view of the image reading apparatus according to a second embodiment of the present invention.

Next, a second embodiment of the present invention is described with reference to FIG. 6. In the first embodiment, both the left hinge 205 and the right hinge 206 are provided to the swing pedestal 306. Depending on the configurations of the ADF 201 and the image reading portion main body 202, only one hinge may be provided to the swing pedestal 306. In the second embodiment, as an example thereof, a configuration in which only the left hinge 205 is provided to the swing pedestal 306 is illustrated. In the following, the same structures as the first embodiment are denoted by the same reference symbols, description thereof is omitted, and structures different from those of the first embodiment are mainly described. FIG. 6 is a partial sectional side view of the image reading apparatus 102 according to the second embodiment. The swing pedestal 306 is provided only to the left hinge 205. FIG. 6 is an enlarged view for illustrating the vicinity of the swing pedestal 306 and the left hinge 205 when the image reading apparatus 102 is viewed from the left side.

The swing axis 307 is provided below the back abutment portion 308 in the vertical direction UD and on the back side with respect to the back abutment portion 308 in the front-back direction FR. The swing pedestal 306 is regulated in the swing range by the swing pedestal regulation member 305 when the ADF 201 is pivoted to the open position or the closed position. When the ADF 201 is closed, the swing pedestal 306 swings about the swing axis 307 by the own weight of the ADF 201, and the front abutment portion 309 (not shown in FIG. 6) is brought into contact with the flow reading glass plate 303. At this time, due to elastic deformation of the back abutment portion 308 and deformation caused by the own weight of the ADF 201, the back abutment portion 308 is also brought into contact with the flow reading glass plate 303.

In the second embodiment, the swing pedestal 306 is provided only to the left hinge 205. Thus, the left side of the ADF 201 swings about the swing axis 307, but the right side of the ADF 201 does not swing. The ADF 201 is not a rigid body, and hence is entirely twisted. The twist of the ADF 201 is extremely small, and hence the twist does not hinder the original conveying function of the ADF 201.

According to the second embodiment, the distance between the ADF 201 and the image reading portion main body 202 is automatically adjusted. Therefore, when the image reading apparatus 102 is to be assembled, an operator is not required to adjust the distance between the ADF 201 and the image reading portion main body 202. Thus, the operation time is shortened, and the manufacturing cost is reduced. According to the second embodiment, the manufacturing cost is reduced.

In the first and second embodiments, the back abutment portion 308 is provided to the ADF 201. However, the back abutment portion 308 is not always required to be provided, and the same effect can be achieved even when the back abutment portion 308 is omitted. In the second embodiment, the swing pedestal 306 is provided only to the left hinge 205. However, the same effect can be achieved even when the swing pedestal 306 is provided only to the right hinge 206. Alternatively, the swing pedestals may be provided independently for the left hinge 205 and the right hinge 206 so that the left side and the right side of the ADF 201 swing independently.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-129306, filed Jul. 11, 2019, which is hereby incorporated by reference herein in its entirety.

What is claimed is:

1. An image reading apparatus, comprising:
   an original conveying unit including a stacking tray on which an original is to be stacked, a conveying unit configured to convey the original stacked on the stacking tray, a discharging unit configured to discharge the original conveyed by the conveying unit, and a discharging tray on which the original discharged by the discharging unit is to be stacked;
   an image reading unit including a transparent member and a reading element configured to read an image of the original being conveyed by the conveying unit through the transparent member;
   a hinge configured to support the original conveying unit, wherein the original conveying unit is rotatable with respect to the image reading unit by the hinge between a closed position in which the original conveying unit covers the transparent member and an open position in which the transparent member is exposed;
   a swing pedestal configured to support the hinge and provided on the image reading unit swingably with respect to the image reading unit;
   a first abutment portion provided on the original conveying unit and configured to abut the image reading unit so as to form a space between the image reading unit and the original conveying unit when the original conveying unit is located in the closed position; and
   a second abutment portion provided on the original conveying unit and configured to abut the image reading unit so as to form a space between the image reading unit and the original conveying unit when the original conveying unit is located in the closed position,
   wherein the first abutment portion is provided on one side of the original conveying unit in a width direction orthogonal to a conveyance direction in which the original is conveyed, and the second abutment portion is provided on another side of the original conveying unit in the width direction.
   wherein a center of a swing of the swing pedestal is provided at a position lower than a position in which the transparent member is disposed.

2. The image reading apparatus according to claim 1, wherein a distance between the first abutment portion and the hinge in the width direction is longer than a distance between the second abutment portion and the hinge in the width direction, and
   wherein in a state in which the original conveying unit is located in the closed position, the center of the swing of the swing pedestal is arranged in a predetermined range including a position of the second abutment portion in the width.

3. The image reading apparatus according to claim 2, wherein in the state in which the original conveying unit is located in the closed position, the center of the swing of the swing pedestal is arranged at a position that matches with the position of the second abutment portion in the width direction and is lower than the transparent member.

4. The image reading apparatus according to claim 2, wherein in the state in which the original conveying unit is located in the closed position, the center of the swing of swing pedestal is arranged at a position within a range of 250 mm from the transparent member to a lower side and within a range of 20 mm from the second abutment portion to a front side in the width direction and 40 mm from the second abutment portion to a back side in the width direction.

5. The image reading apparatus according to claim 1, further comprising a regulation member configured to regulate a swing range of the swing pedestal.

6. The image reading apparatus according to claim 1, wherein the swing pedestal is swingable with respect to the image reading unit by an own weight of the original conveying unit.

* * * * *